US012602495B2

(12) United States Patent
Park

(10) Patent No.: US 12,602,495 B2
(45) Date of Patent: Apr. 14, 2026

(54) AUTHENTICATION INFORMATION TRANSMISSION DEVICE USING INAUDIBLE SOUND WAVE COMMUNICATION

(71) Applicant: MUZLIVE INC., Seoul (KR)

(72) Inventor: Jong Sung Park, Seoul (KR)

(73) Assignee: MUZLIVE INC., Seoul (KR)

( * ) Notice: Subject to any disclaimer, the term of this patent is extended or adjusted under 35 U.S.C. 154(b) by 463 days.

(21) Appl. No.: 18/022,321

(22) PCT Filed: Nov. 23, 2020

(86) PCT No.: PCT/KR2020/016564

§ 371 (c)(1),
(2) Date: Feb. 21, 2023

(87) PCT Pub. No.: WO2022/050496

PCT Pub. Date: Mar. 10, 2022

(65) Prior Publication Data

US 2023/0325486 A1      Oct. 12, 2023

(30) Foreign Application Priority Data

Sep. 3, 2020      (KR) ........................ 10-2020-0112422

(51) Int. Cl.
*G06F 21/60*      (2013.01)
*G06F 21/35*      (2013.01)
(Continued)

(52) U.S. Cl.
CPC ............ *G06F 21/606* (2013.01); *G06F 21/35* (2013.01); *G06F 21/45* (2013.01); *G06F 21/60* (2013.01);
(Continued)

(58) Field of Classification Search
CPC ........ G06F 21/606; G06F 21/35; G06F 21/45; G06F 21/60; G06F 21/31; H04B 11/00; H04L 27/10
See application file for complete search history.

(56) References Cited

U.S. PATENT DOCUMENTS

2004/0133789 A1*   7/2004   Gantman ........... G06Q 20/4014
                                                            713/189
2007/0254604 A1*  11/2007   Kim ...................... H04W 84/18
                                                            455/88
(Continued)

FOREIGN PATENT DOCUMENTS

KR      10-1997-0055903 A      7/1997
KR            20-0291064 Y1      10/2002
(Continued)

OTHER PUBLICATIONS

International Search Report from corresponding PCT Application No. PCT/KR2020/016564, dated Sep. 24, 2021.

*Primary Examiner* — Cheng-Feng Huang
(74) *Attorney, Agent, or Firm* — Harness, Dickey & Pierce, P.L.C.

(57)      ABSTRACT

An authentication device includes a storage unit for storing authentication information and a plurality of precondition signals corresponding to conversion methods for converting the authentication information into sound waves; a control unit for selecting at least one precondition signal from among the plurality of precondition signals, and converting the authentication information into a sound wave signal by means of a conversion method corresponding to the selected precondition signal; and a sound wave output unit for outputting, as a sound wave signal, the selected precondition signal and the authentication information which has been converted into a sound wave signal.

7 Claims, 7 Drawing Sheets

(51) Int. Cl.
    G06F 21/45         (2013.01)
    H04B 11/00         (2006.01)
    *G06F 21/31*         (2013.01)
    *H04L 27/10*         (2006.01)

(52) U.S. Cl.
    CPC .............. H04B 11/00 (2013.01); *G06F 21/31*
                (2013.01); *H04L 27/10* (2013.01)

(56)              References Cited

U.S. PATENT DOCUMENTS

2010/0318324 A1*  12/2010  Kim ................... H04L 41/0631
                                              702/183
2018/0026728 A1*   1/2018  Feng ...................... G08C 23/02
                                              704/500
2022/0264653 A1*   8/2022  Xiong ................... H04L 1/001

FOREIGN PATENT DOCUMENTS

KR     10-2006-0056334 A     5/2006
KR     10-2007-0029987 A     3/2007
KR     10-2020-0047214 A     5/2020

* cited by examiner

| character | Preamble | | |
|---|---|---|---|
| | A | B | C |
| 0 | 16000Hz | 16160Hz | 16320Hz |
| 1 | 32000Hz | 32160Hz | 32320Hz |
| 2 | 48000Hz | 48160Hz | 48320Hz |
| 3 | 64000Hz | 64160Hz | 64320Hz |
| 4 | 80000Hz | 80160Hz | 80320Hz |
| 5 | 96000Hz | 96160Hz | 96320Hz |
| ⋮ | ⋮ | ⋮ | ⋮ |

Start

Receive sound wave signal — S710

Specify preamble signal — S720

Convert sound wave signal into authentication information that is digital information using mapping table — S730

Transmit authentication information to management server — S740

End

FIG. 8

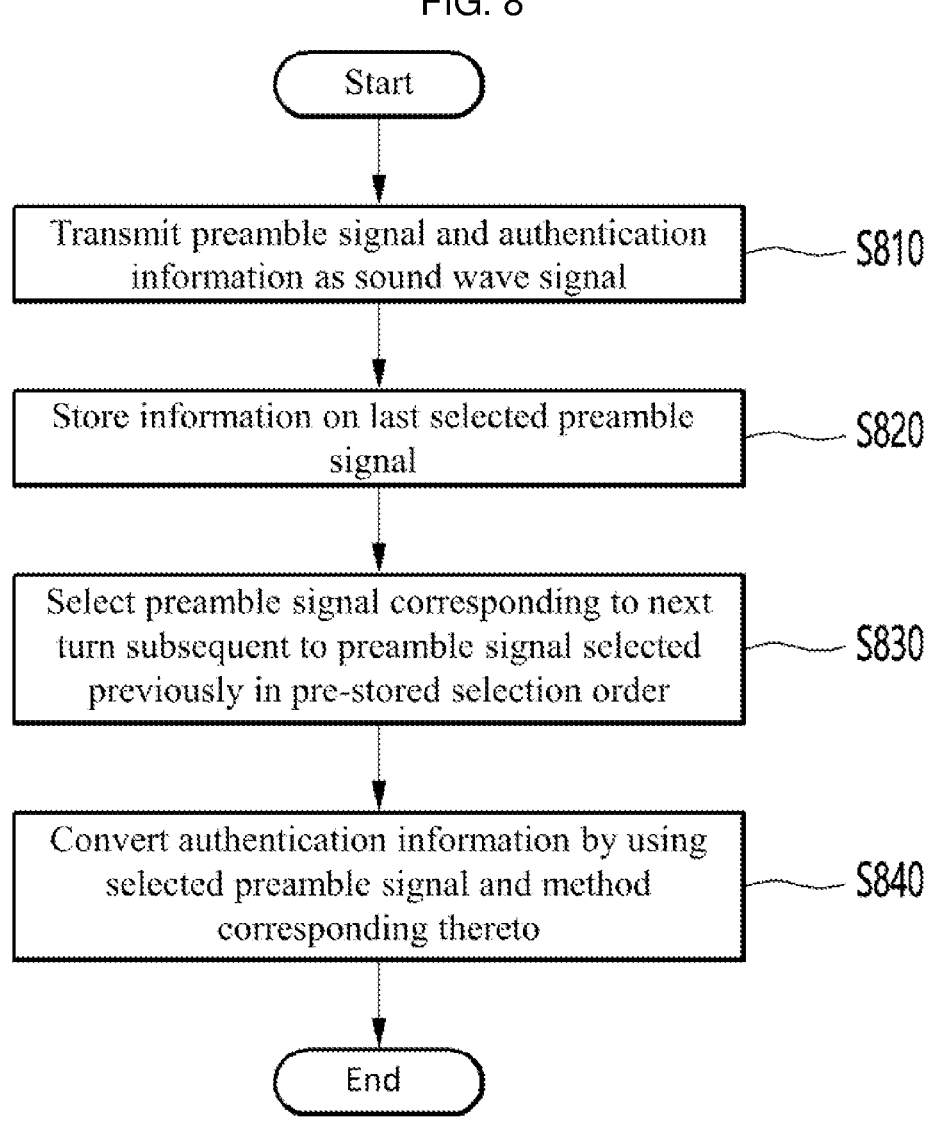

Start

Transmit preamble signal and authentication information as sound wave signal — S810

Store information on last selected preamble signal — S820

Select preamble signal corresponding to next turn subsequent to preamble signal selected previously in pre-stored selection order — S830

Convert authentication information by using selected preamble signal and method corresponding thereto — S840

End

Figure 9:
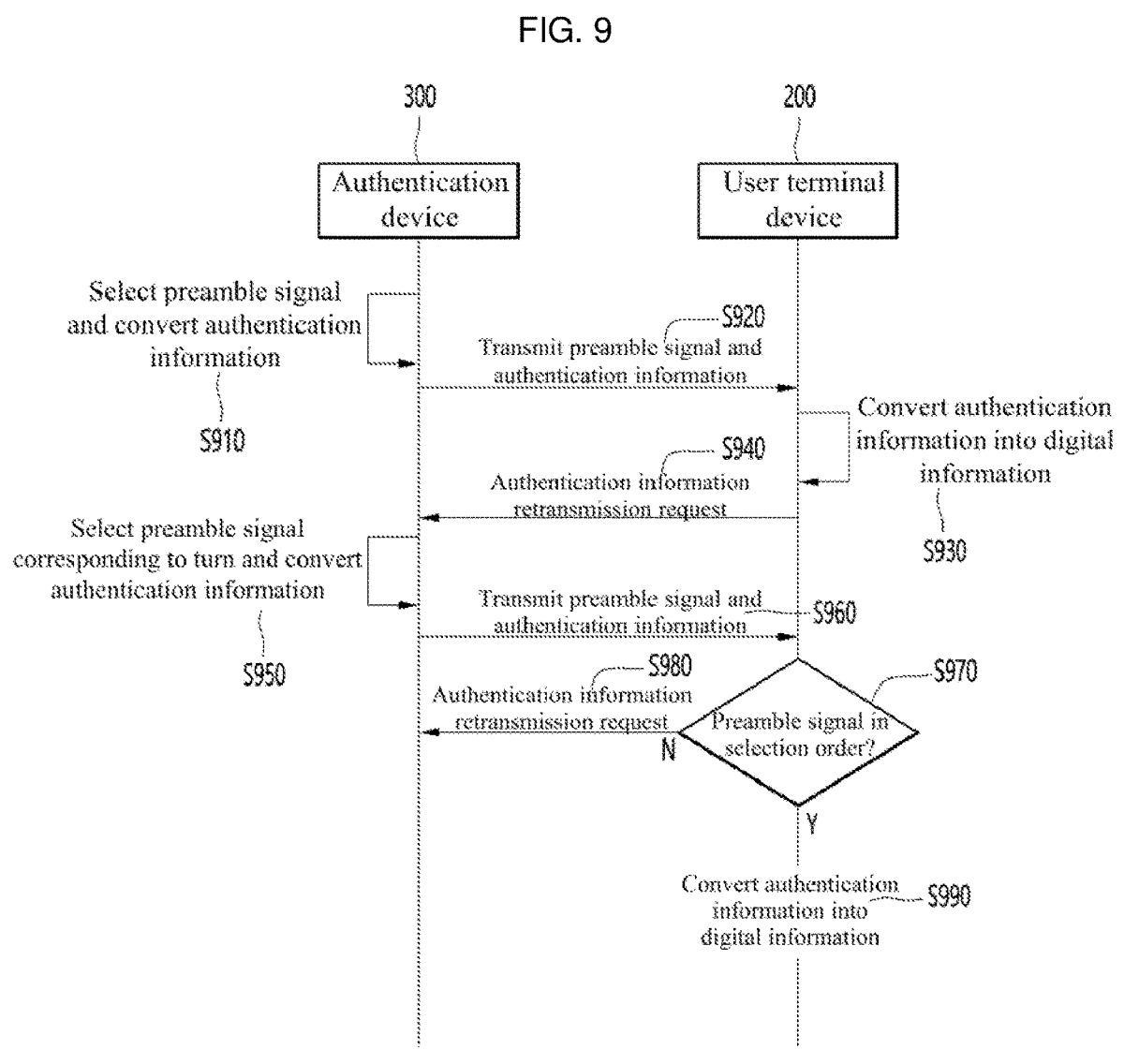

Authentication                              User terminal
device                                      device Select preamble signal
and convert authentication          ⌐———— S920
information              Transmit preamble signal and
                         authentication information
                                                                    Convert authentication
S910                                                                information into digital
                                            ⌐———— S940             information
                              Authentication information
                              retransmission request
                                                                          S930
Select preamble signal
corresponding to turn and convert
authentication information   Transmit preamble signal and   ⌐ S960
                             authentication information
                          ⌐———— S980                                              ⌐———— S970
S950              Authentication information
                  retransmission request      Preamble signal in
                                        N      selection order?

Y

Convert authentication   ⌐ S990
                                        information into
                                        digital information

AUTHENTICATION INFORMATION TRANSMISSION DEVICE USING INAUDIBLE SOUND WAVE COMMUNICATION

CROSS-REFERENCE TO RELATED APPLICATIONS

This application is a national phase application of PCT Application No. PCT/KR2020/016564, filed on Nov. 23, 2020, which claims the benefit and priority of Korean Application No. 10-2020-0112422, filed on Sep. 3, 2020. The entire disclosures of the applications identified in this paragraph are incorporated herein by references.

TECHNICAL FIELD

The present invention relates to an authentication information transmission device using inaudible sound wave communication, and more particularly, to an authentication information transmission device using inaudible sound wave communication in which a frequency modulation method is included in a preamble signal to improve security.

BACKGROUND ART

A cultural technology narrowly refers to a technology required for planning, development, production, and the like of various types of cultural content such as movies, games, and animations, but in a broad sense, refers to an overall technology for improving the quality of cultural life on the basis of science and technology.

With the development of such a cultural technology, a new type of content transfer medium that breaks away from an existing scheme has begun to appear. For example, in an album market, USB-type albums or albums that can be connected to an AUX terminal of a smartphone have begun to appear to replace traditional CD-type albums.

Such new types of albums are distributed in the form of sales of a storage medium having authentication information stored therein. When a user who purchases the storage medium having authentication information stored therein connects the storage medium to a terminal device such as a smartphone or tablet PC and then executes a corresponding application, music content corresponding to the authentication information is downloaded from a server to the terminal device.

However, since recent smart phones, tablet PCs, or the like are released without a traditional interface such as an AUX terminal, a problem has arisen in that the interface as described above cannot be utilized to transmit the authentication information stored in the storage medium to a user terminal device.

A method of transmitting the authentication information to the user terminal device through a wireless communication network interface such as Wi-Fi or Bluetooth may be considered, but in this case, there are problems that the storage medium having the authentication information stored therein should include a wireless communication network module as described above, and it takes a predetermined time to construct a pairing between the user terminal device and the storage medium, making users uncomfortable.

Accordingly, a scheme of downloading content by transmitting the authentication information to the outside using inaudible sound wave communication has been devised.

A method using the inaudible sound wave communication has advantages that a separate communication module is not required and a pairing process for data transmission and reception between devices is not required, but has a problem with security vulnerability because authentication information converted into sound waves may leak due to unauthorized recording or the like.

Accordingly, a need has emerged for a new type of authentication information transmission device using inaudible sound wave communication capable of improving security while enjoying advantages of the inaudible sound wave communication, and a method therefor.

SUMMARY

The present invention has been made to solve the above problems, and an object of the present invention is to provide an authentication information transmission device using inaudible sound wave communication capable of preventing authentication information from leaking and being used in inaudible sound wave communication.

Objects of the present invention are not limited to the object mentioned above, and other objects not mentioned will be clearly understood by those skilled in the art from the description below.

In order to achieve the above object, an authentication device according to an embodiment of the present invention includes a storage unit configured to store authentication information, and a plurality of preamble signals corresponding to a conversion method of converting the authentication information into sound waves; a control unit configured to select at least one preamble signal from among the plurality of preamble signals and convert the authentication information into a sound wave signal by using a conversion method corresponding to the selected preamble signal; and a sound wave output unit configured to output, as a sound wave signal, the selected preamble signal and the authentication information converted into the sound wave signal.

According to an embodiment of the present invention, the storage unit may store a mapping table regarding a frequency of a sound wave signal corresponding to a character or a number for each of the plurality of preamble signals.

According to an embodiment of the present invention, the control unit may convert the authentication information into a sound wave signal by using a first method corresponding to a first preamble signal when the first preamble signal is selected from among the plurality of preamble signals stored in the storage unit, and convert the authentication information into a sound wave signal by using a second method corresponding to a second preamble signal when the second preamble signal is selected.

According to an embodiment of the present invention, the control unit may generate a different sound wave signal for each preamble signal selected for the same authentication information.

According to an embodiment of the present invention, the control unit may sequentially select or randomly select the plurality of preamble signals stored in the storage unit, and convert the authentication information into the sound wave signal by using a conversion method corresponding to the selected preamble signal.

According to an embodiment of the present invention, the storage unit may store information on a selection order of the preamble signals.

According to an embodiment of the present invention, the control unit may select one of the plurality of preamble signals, convert the authentication information into a sound wave signal by using a conversion method corresponding to the selected preamble signal, and store information on the selected preamble signal.

According to an embodiment of the present invention, the control unit may select a preamble signal corresponding to a next turn subsequent to a preamble signal previously selected in the selection order when an authentication information transmission command is received again.

An authentication system including an authentication device, a user terminal device, and a management server according to another embodiment of the present invention includes selecting, by the authentication device, a preamble signal, converting authentication information into a sound wave signal by using a conversion method corresponding to the selected preamble signal, and transmitting the sound wave signal to the user terminal device; transmitting, by the user terminal device receiving the sound wave signal, an authentication information retransmission request signal to the authentication device; selecting, by the authentication device, a preamble signal corresponding to a next turn subsequent to a preamble signal previously selected in a pre-stored preamble signal selection order, converting the authentication information into a sound wave signal by using a conversion method corresponding to the selected preamble signal, and retransmitting the sound wave signal to the user terminal device; determining, by the user terminal device, whether or not the preamble signal included in the sound wave signal is a preamble signal in the pre-stored preamble signal selection order; and transmitting, by the user terminal device, the authentication information retransmission request signal to the authentication device when a determination is made that a preamble signal not in the selection order is included in the sound wave signal, and converting the authentication information in the form of a sound wave signal into digital information, and transmitting the authentication information to the management server when a determination is made that the preamble signal in the selection order is included.

Advantageous Effects

According to the authentication device described above, since the sound wave signal for transmitting the same authentication information is changed according to a type of preamble signal, it is externally recognized that a random sound wave signal is output each time the authentication information is transmitted, making it possible to achieve an enhanced security effect.

It is also possible to achieve an effect of preventing the authentication information from leaking from the sound wave signal.

Effects of the present invention are not limited to the effects mentioned above, and other effects not mentioned will be clearly understood by those skilled in the art from the description of the claims.

BRIEF DESCRIPTION OF THE DRAWINGS

FIG. 1 is a system diagram illustrating an authentication system according to an embodiment of the present invention.

4

Figure 3:
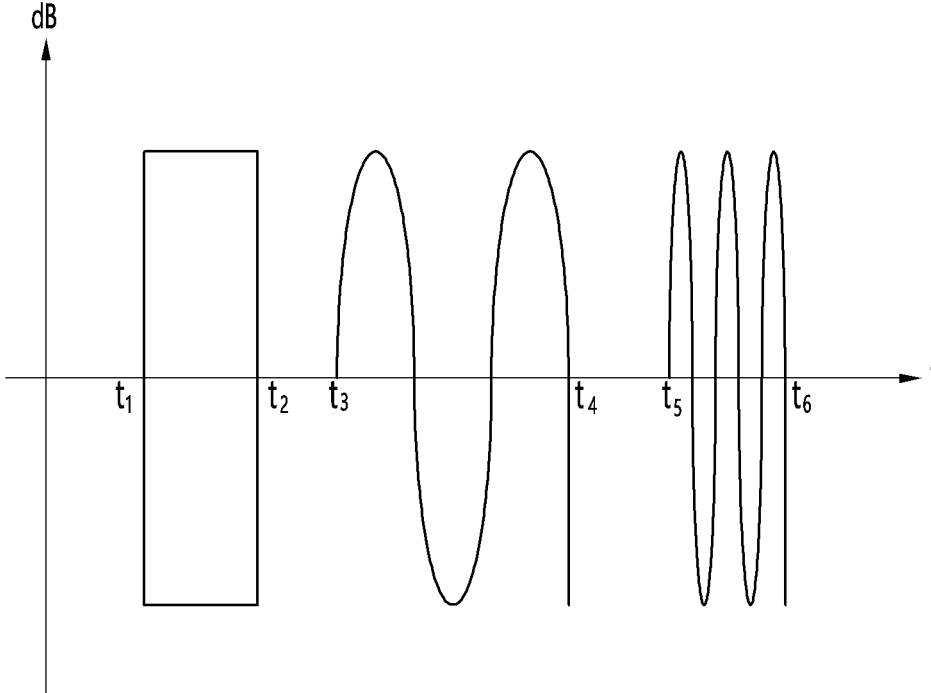
Figures 5, 6:
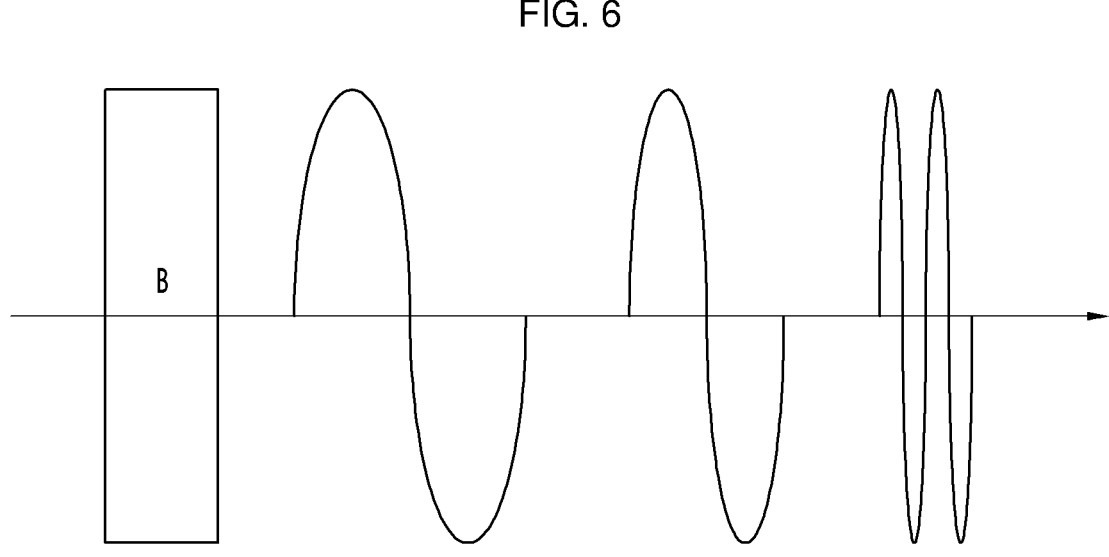
Figure 7:
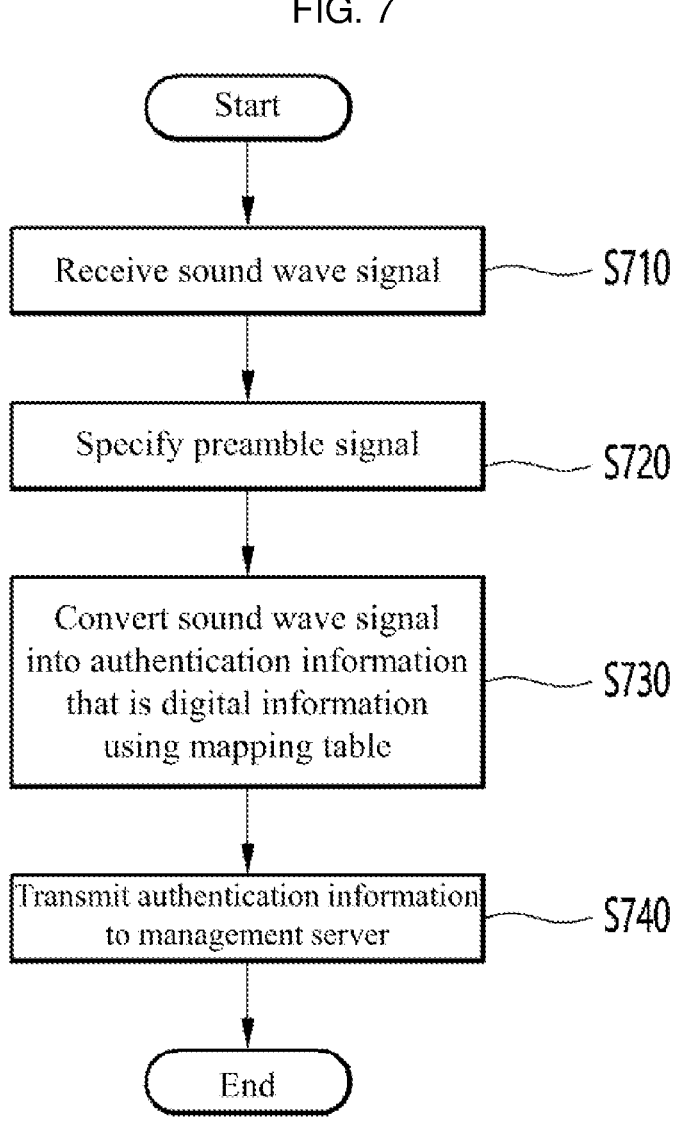

FIG. 3 is a diagram illustrating a sound wave signal output from an authentication device according to an embodiment of the present invention.
FIG. 4 is a diagram illustrating a relationship between a preamble signal and a frequency corresponding to a character or a number.
FIGS. 5 and 6 are diagrams illustrating authentication information converted into a sound wave signal in a different form depending on the preamble signal according to an embodiment of the present invention.
FIG. 7 is a flowchart illustrating a process in which a user terminal device receives authentication information converted into various types of sound wave signals and converts the authentication information into original digital information according to an embodiment of the present invention.
FIG. 8 is a flowchart illustrating an order in which the authentication device selects a plurality of preamble signals according to an embodiment of the present invention.
FIG. 9 is a timing diagram illustrating a process of transmitting and receiving authentication information by interworking between the user terminal device and the authentication device according to an embodiment of the present invention.

DESCRIPTION OF EXEMPLARY EMBODIMENTS

Hereinafter, embodiments of the present invention will be described in detail with reference to the accompanying drawings. However, the accompanying drawings are only described in order to more easily disclose the content of the present invention, and it can be easily understood by those skilled in the art that the scope of the present invention is not limited to the scope of the accompanying drawings.

When the embodiments of the present invention are described, the same names and the same reference signs are used for components having the same functions, but it is to be noted in advance that the components are not substantially the same as those of the prior art.

Further, terms used herein are only used to describe specific embodiments, and are not intended to limit the present invention. Singular expressions include plural expressions unless the context clearly dictates otherwise. It should be understood that the terms "include" or "have" used therein are intended to designate that there is a feature, number, step, operation, component, part, or combination thereof described herein, and does not preclude the presence or addition of one or more other features numbers, steps, operations, components, parts, or combinations thereof.

Figure 1:
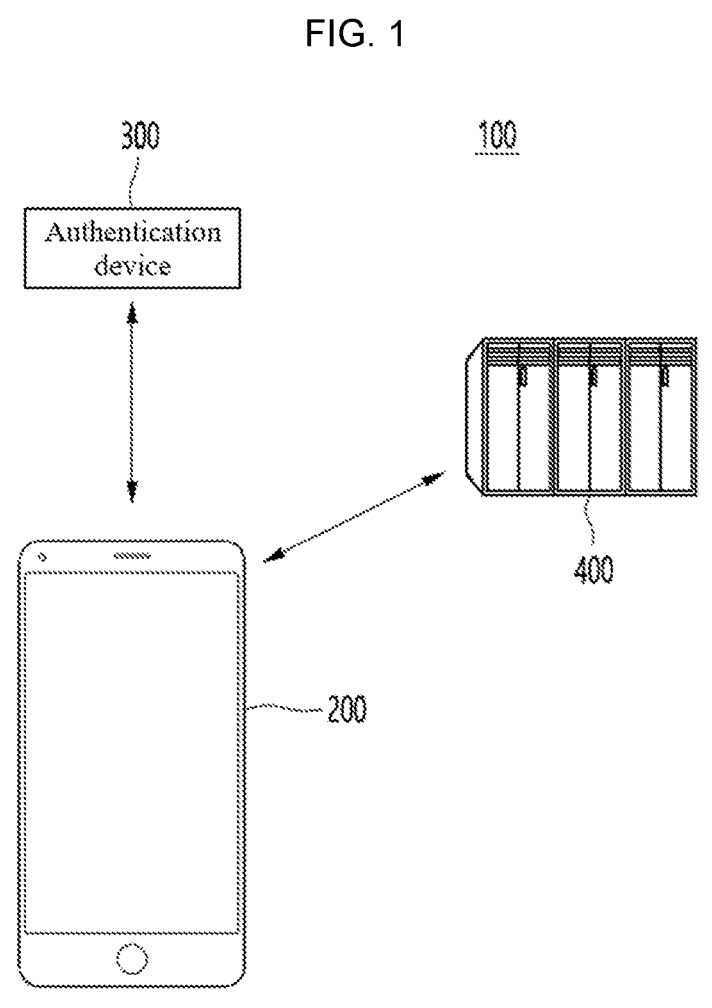

FIG. 1 is a system diagram illustrating an authentication system according to an embodiment of the present invention.

The authentication system 100 according to an embodiment of the present invention includes a user terminal device 200, an authentication device 300, and a management server 400.

The user terminal device 200 is an electronic device such as a smart phone or a tablet PC, and may have a dedicated application capable of reproducing content received from the management server 400 installed thereon. Further, the dedicated application may receive the authentication information transmitted from the authentication device 300 and transmit the authentication information to the management server 400 so that an authentication procedure is performed.

The authentication device 300 stores authentication information required for downloading of content from the management server. Further, the authentication device 300 may include a sound wave output unit (not illustrated) that converts the authentication information into a predetermined sound wave signal and outputs the sound wave signal. The sound wave output unit according to an embodiment of the present invention may be implemented as a speaker.

The management server 400 stores a plurality of content files corresponding to the authentication information.

Although an example in which the management server 400 is one physical server has been illustrated in the present embodiment, this is for convenience of description and it is obvious that the management server 400 may be physically or logically divided into a server that performs authentication, a server that stores content files, and the like.

When the management server 400 is physically or logically divided into the authentication server and the content storage server, the management server 400 transmits, to the user terminal device 200, an acquisition path along which content corresponding to the authentication information received from the user terminal device 200 can be downloaded.

The user terminal device 200, which has received the acquisition path, may access the content storage server along the acquisition path and download the content corresponding to the authentication information.

Hereinafter, a process in which the authentication device 300 transmits the authentication information to the user terminal device 200 in a non-contact manner will be described in detail.

Figure 2:
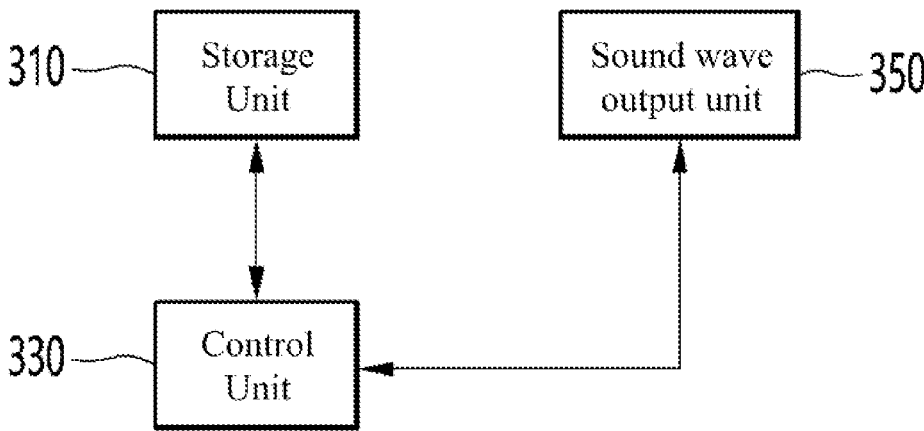
FIG. 2 is a functional block diagram illustrating an authentication information transmission device using inaudible sound wave communication according to an embodiment of the present invention.

FIG. 2 is a functional block diagram illustrating the authentication information transmission device using inaudible sound wave communication according to an embodiment of the present invention.

The authentication device 300 according to an embodiment of the present invention includes a storage unit 310, a control unit 330, and a sound wave output unit 350. Since only components related to the present invention are illustrated in FIG. 2, it is obvious that other components may be further included, in addition to components related to embodiments to be described below.

The storage unit 310 stores the authentication information and a plurality of preamble signals corresponding to a conversion method for converting the authentication information into sound waves. The authentication information is information for downloading content from the management server 400 or acquiring a path along which the content can be downloaded. To this end, information corresponding to the content corresponding to the authentication information may be stored in the management server 400.

The authentication information may be at least one number, character, or combination thereof.

Meanwhile, the preamble signal refers to a signal for notifying the user terminal device 200 that the authentication information converted into a sound wave signal will be transmitted, in advance. Since the user terminal device 200 cannot always maintain a standby state to receive the authentication information transmitted in the form of sound waves from the authentication device 300, the preamble signal is first transmitted so that an idle state can be switched to a mode for receiving the authentication information.

A method of converting the authentication information into a sound wave signal depends on the preamble signal, and a specific method of converting the authentication information into the sound wave signal will be described hereinafter.

The control unit 330 selects at least one of the plurality of preamble signals, and converts the authentication information into a sound wave signal by using a conversion method corresponding to the selected preamble signal.

When a first preamble signal is selected, the authentication information is converted into a sound wave signal by using a first method corresponding thereto, and when a second preamble signal is selected, the authentication information is converted into a sound wave signal by using a second method corresponding thereto.

Meanwhile, the control unit 330 may sequentially or randomly select the plurality of preamble signals stored in the storage unit 310 and convert the authentication information into the sound wave signal by using the conversion method corresponding to the selected preamble signal.

That is, since the preamble signal is selected and the authentication information is converted into a sound wave signal by using a method corresponding to the preamble signal each time an authentication information generation command is received, one piece of authentication information is converted into a different type of sound wave signal. Therefore, even when the sound wave signal leaks to the outside, it is possible to improve the security of the original authentication information.

The sound wave output unit 350 outputs the preamble signal selected by the control unit 330 and the authentication information converted into a sound wave signal as a sound wave signal. To this end, the sound wave output unit 350 according to an embodiment of the present invention may be implemented as a speaker.

The user terminal device 200, which has received the sound wave signal output from the sound wave output unit 350, specifies a conversion method using the preamble signal included in the sound wave signal, and converts the authentication information converted into the sound wave signal into original digital information. To this end, the conversion method corresponding to the preamble signal may be stored in the user terminal device 200 in advance.

Hereinafter, a preamble signal, authentication information converted into a sound wave signal, and an authentication information transmission method using the same will be described in detail.

FIG. 3 is a diagram illustrating a sound wave signal output from an authentication device according to an embodiment of the present invention.

The control unit 330 according to an embodiment of the present invention outputs the preamble signal prior to outputting the authentication information converted into the sound wave signal. As described above, the preamble signal is a signal for easily identifying a point in time for accurate data analysis before the user terminal device 200 receives and analyzes the sound wave signal.

The preamble signal is output from t1 to t2, as illustrated in FIG. 3. When the output of the preamble signal ends, a sound wave signal having a frequency corresponding to a character or a number included in the authentication information is output.

For example, when the authentication information is "123", a sound wave signal having a frequency corresponding to the number "1" is output for a predetermined time, and then a sound wave signal having a frequency corresponding to "2" and a sound wave signal having a frequency corresponding to "3" are sequentially output for a predetermined time.

A sound wave signal having the frequency corresponding to the number or the character included in the authentication information may be output for a predetermined period of time or output repeatedly at a predetermined period.

Further, although a case in which the sound wave signals corresponding to the preamble signal and the recognition information are output in the same size has been illustrated by way of example in FIG. 3, the present invention may be implemented so that the sound wave signals are output in different sizes.

Meanwhile, a frequency of a sound wave signal corresponding to a character or a number included in the authentication information may be determined by the preamble signal.

FIG. 4 is a diagram illustrating a relationship between the preamble signal and the frequency corresponding to the character or the number.

The storage unit 310 according to an embodiment of the present invention may store a mapping table for a plurality of preamble signals and frequencies of sound wave signals corresponding to a character or a number for each preamble signal.

In the mapping table illustrated in FIGS. 4, A, B, and C denote types of preamble signals. Further, a number written in a left column indicates information that may be included in the authentication information. Although only the number is illustrated in FIG. 4, it is obvious that a character, a special character, or the like may be further included, in addition to the number in the authentication information.

The frequency corresponding to the character or the number included in the authentication information is determined by the preamble signal.

For example, when the authentication information is "123" and A is selected as the preamble signal, 1 is converted into a sound wave signal at 16,000 Hz, 2 is converted into a sound wave signal at 32,000 Hz, and 3 is converted into a sound wave signal at 48,000 Hz.

In this case, the authentication device 300 outputs a sound wave signal corresponding to the preamble signal A for a predetermined time, and then, sequentially outputs a sound wave signal at 16,000 Hz, a sound wave signal at 32,000 Hz, and a sound wave signal at 48,000 Hz.

Meanwhile, the control unit 330 according to an embodiment of the present invention generates a different sound wave signal for each preamble signal that is selected for the same authentication information.

In the above-described example, when B is selected as the preamble signal for the same authentication information "123", a sound wave signal corresponding to the preamble signal B is output for a predetermined time, and then, a sound wave signal at 16,160 Hz, a sound wave signal at 32,160 Hz, and a sound wave signal at 48,160 Hz are sequentially output as completely different sound wave signals from those in the first example.

FIGS. 5 and 6 are diagrams illustrating the authentication information converted into different types of sound wave signals depending on the preamble signal according to an embodiment of the present invention.

In FIG. 5, predetermined authentication information converted into a sound wave signal when A is selected as a preamble signal is shown. Meanwhile, in FIG. 6, predetermined authentication information converted into a sound wave signal when B is selected as a preamble signal is shown.

That is, since the sound wave signal for transmitting the same authentication information is changed according to the type of preamble signal selected by the control unit 330, it is possible to improve security.

FIG. 7 is a flowchart illustrating a process in which a user terminal device receives authentication information converted into various types of sound wave signals and converts the authentication information into original digital information according to an embodiment of the present invention.

In order to acquire the authentication information from the sound wave signal, which is an analog signal, the sound wave signal should be converted into original authentication information, which is digital information.

To this end, the user terminal device 200 first receives the sound wave signal (S710). The sound wave signal may be received through a microphone included in the user terminal device 200.

When the sound wave signal is received, the user terminal device 200 specifies the preamble signal included in the sound wave signal and the conversion method corresponding to the preamble signal (S720). To this end, the user terminal device 200 may also have stored the mapping table described in FIG. 4 in advance.

The user terminal device 200 compares the preamble signal included in the received sound wave signal with the mapping table to specify the conversion method, and then converts a sound wave signal at a predetermined frequency received after the preamble signal into a character or a number that is corresponding digital information (S730).

When the authentication information is confirmed from the analog signal, the authentication information is transmitted to the management server 400, the authentication procedure is performed, and when the authentication is successful, content corresponding to the authentication information is downloaded and provided to the user (S740).

FIG. 8 is a flowchart illustrating an order in which the authentication device selects a plurality of preamble signals according to an embodiment of the present invention.

Although the control unit 330 according to an embodiment of the present invention may randomly select one preamble signal from among the plurality of preamble signals stored in the storage unit 310, the control unit 330 may sequentially select the preamble signal in a pre-stored order.

According to the above-described method, the control unit 330 first selects one preamble signal from among the plurality of preamble signals stored in the storage unit 310, converts the authentication information into a sound wave signal by using a corresponding conversion method, and transmits the sound wave signal (S810).

The control unit 330 stores information of a last selected preamble signal in the storage unit 310 (S820). For example, when three preamble signals A, B, and C are stored in the storage unit 310 and an immediately previously selected preamble signal is A, information on this is stored.

Meanwhile, information on an order in which the preamble signals are selected may be stored in the storage unit 310 in advance. When there are three types of preamble signals, information on the selection order such as A→B→C may be stored. In this case, A corresponding to the first turn is selected after the preamble signal corresponding to the last turn is selected.

Then, when the authentication information transmission command is received again, the preamble signal corresponding to the next turn subsequent to the preamble signal selected previously in the pre-stored selection order (S830). In the above-described example, when the immediately previously selected preamble signal is A, B corresponding to the next turn is selected.

When the preamble signal corresponding to the next turn is selected, the authentication information is converted into a sound wave signal by using a method corresponding to the preamble signal and is transmitted (S840).

FIG. 9 is a timing diagram illustrating a process of transmitting and receiving the authentication information by interworking between the user terminal device and the authentication device according to an embodiment of the present invention.

When the authentication information transmission command is received from the user, the authentication device 300 selects at least one preamble signal from among a plurality of pre-stored preamble signals and converts the authentication information using a corresponding conversion method (S910).

Thereafter, the selected preamble signal and the authentication information are transmitted in the form of a sound wave signal (S920).

The user terminal device 200, which has received the sound wave signal, converts the authentication information of the sound wave signal into digital information using the mapping table that has been stored in advance (S930). Specifically, the original authentication information is acquired by specifying the type of preamble signal included in the sound wave signal and specifying a character or number corresponding to a frequency of an inaudible sound wave signal according to the specified type of preamble signal.

The user terminal device 200, which has received the authentication information, transmits the authentication information retransmission request to the authentication device 300 (S940). The reason why the authentication information is requested again despite the authentication information having been acquired is intended to confirm whether the authentication device 300 transmitting the authentication information in the form of a sound wave signal is a device distributed along a normal route or an unauthorized device that has unauthorizedly recorded the sound wave signal.

The authentication device 300, which has received the authentication information retransmission request, selects the preamble signal corresponding to the next turn in the pre-stored preamble signal selection order, and converts the authentication information by using a conversion method corresponding to the preamble signal corresponding to the next turn (S950).

A preamble signal different from a previously transmitted sound wave signal, and a sound wave signal converted by using a different conversion method are transmitted to the user terminal device 200 (S960).

The user terminal device 200 may include information on a selection order for a plurality of preamble signals, like the authentication device 300. For example, when there are three types of preamble signals, the information on the selection order such as A→B→C may be stored, as described in FIG. 8.

The user terminal device 200 determines whether or not the preamble signal included in the sound wave signal is a preamble signal in the pre-stored selection order of preamble signals (S970). For example, when the preamble signal included in the immediately previously received sound wave signal is A, the user terminal device 200 determines whether the preamble signal included in the currently received sound wave signal is B.

When a determination is made that the sound wave signal including the preamble signal that is not in the selection order has been received, an authentication information retransmission request signal is transmitted to the authentication device 300 (S980).

On the other hand, when the preamble signal included in the received sound wave signal is the preamble signal in the pre-stored preamble signal selection order, the authentication information in the form of a sound wave signal is converted into digital information by using the mapping table (S990), and then is transmitted to the management server 400, so that the authentication procedure is performed.

As described above, the authentication procedure is performed by transmitting and receiving the authentication information of the sound wave signal multiple times using the information on the preamble signal selection order stored in the user terminal device 200 and the authentication device 300, making it possible to achieve an effect of preventing content from being used unauthorizedly due to leakage of the authentication information.

For example, when authentication is attempted by unauthorizedly recording the authentication information transmitted in the form of a sound wave signal and transmitting the authentication information to the user terminal device 200, a subsequent sound wave signal in the pre-stored preamble signal selection order is requested, such that abnormal authentication attempts are blocked.

The preferred embodiments according to the present invention have been described above, and it is obvious to those skilled in the art that the present invention can be embodied in other specific forms without departing from the spirit or scope of the present invention, in addition to the above-described embodiments. Therefore, the above-described embodiments are to be regarded as illustrative rather than restrictive, and thus the present invention is not limited to the above description, but may be changed within the appended claims and their equivalents.

What is claimed is:

1. An authentication device comprising:
storage circuitry configured to store authentication information, and a plurality of preamble signals corresponding to a conversion method of converting the authentication information into sound waves;
control circuitry configured to select at least one preamble signal from among the plurality of preamble signals and convert the authentication information into a sound wave signal by using a conversion method corresponding to the selected preamble signal; and
sound wave output circuitry configured to output, as a sound wave signal, the selected preamble signal and the authentication information converted into the sound wave signal,
wherein the storage circuitry stores a mapping table regarding a frequency of a sound wave signal corresponding to a character or a number for each of the plurality of preamble signals, and
wherein the control circuitry converts the authentication information into a sound wave signal by using a first method corresponding to a first preamble signal when the first preamble signal is selected from among the plurality of preamble signals stored in the storage circuitry, and converts the authentication information into a sound wave signal by using a second method corresponding to a second preamble signal when the second preamble signal is selected.

2. The authentication device according to claim 1, wherein the control circuitry generates a different sound wave signal for each preamble signal selected for the same authentication information.

3. The authentication device according to claim 1, wherein the control circuitry sequentially or randomly selects the plurality of preamble signals stored in the storage circuitry, and converts the authentication information into the sound wave signal by using a conversion method corresponding to the selected preamble signal.

4. The authentication device according to claim 3, wherein the storage circuitry stores information on a selection order of the preamble signals.

5. The authentication device according to claim 4, wherein the control circuitry selects one of the plurality of preamble signals, converts the authentication information into a sound wave signal by using a conversion method corresponding to the selected preamble signal, and stores information on the selected preamble signal.

6. The authentication device according to claim 5, wherein the control circuitry selects a preamble signal corresponding to a next turn subsequent to a preamble signal previously selected in the selection order when an authentication information transmission command is received again.

7. An authentication method for an authentication system including an authentication device, a user terminal device, and a management server, the authentication method comprising:

selecting, by the authentication device, a preamble signal, converting authentication information into a sound wave signal by using a conversion method corresponding to the selected preamble signal, and transmitting the sound wave signal to the user terminal device;

transmitting, by the user terminal device receiving the sound wave signal, an authentication information retransmission request signal to the authentication device;

selecting, by the authentication device, a preamble signal corresponding to a next turn subsequent to a preamble signal previously selected in a pre-stored preamble signal selection order, converting the authentication information into a sound wave signal by using a conversion method corresponding to the selected preamble signal, and retransmitting the sound wave signal to the user terminal device;

determining, by the user terminal device, whether or not the preamble signal included in the sound wave signal is a preamble signal in the pre-stored preamble signal selection order; and transmitting, by the user terminal device, the authentication information retransmission request signal to the authentication device when a determination is made that a preamble signal not in the selection order is included in the sound wave signal, and converting the authentication information in the form of a sound wave signal into digital information, and transmitting the authentication information to the management server when a determination is made that the preamble signal in the selection order is included.

* * * * *